Patented Jan. 24, 1928.

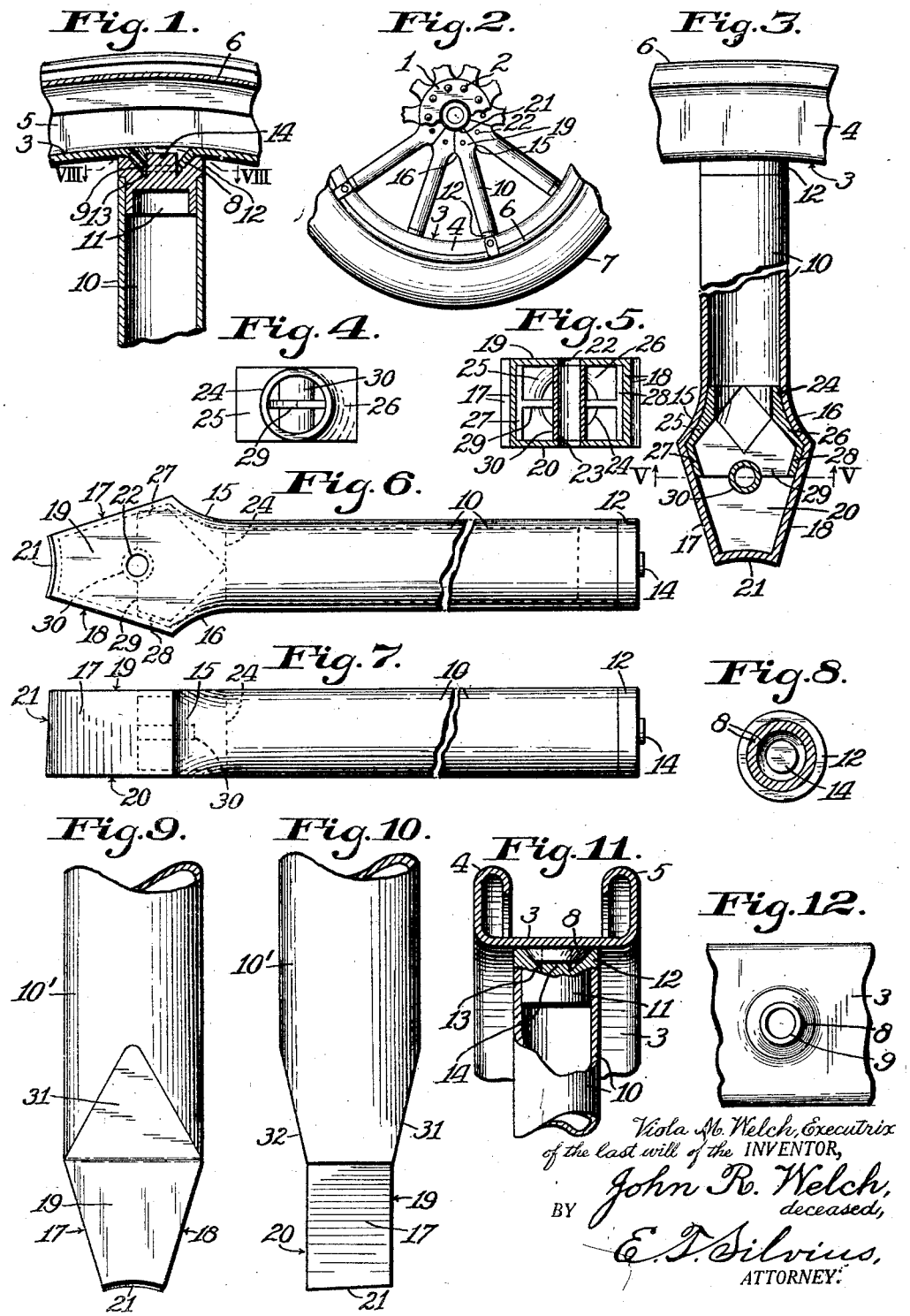

1,657,439

UNITED STATES PATENT OFFICE.

JOHN R. WELCH, DECEASED, LATE OF MUNCIE, INDIANA, BY VIOLA M. WELCH, EXECUTRIX, OF MUNCIE, INDIANA, ASSIGNOR TO VIOLA M. WELCH, OF MUNCIE, INDIANA.

METAL WHEEL SPOKE.

Application filed December 10, 1923. Serial No. 679,535.

This invention relates to vehicle wheels and especially to the small wheels with which motor vehicles are provided, the invention having reference more particularly to hollow metal wheel spokes and their connections with the hub and the felly of the wheel.

An object of the invention is to provide an improved hollow metal wheel spoke that shall be so constructed as to permit of its being produced by various processes, as of pressed steel, stamped, drawn or swaged, and which shall be strong and yet be of light weight and not costly to manufacture.

Another object is to provide a hollow metal wheel spoke which shall resemble the well-known wooden spoke as to contour, and which shall be capable of use instead of the wooden spoke.

A further object is to provide an improved hollow metal wheel spoke which may be produced mainly of drawn and otherwise shaped sheet steel, inherently continuous and which shall have a smooth seamless sector portion without welding and provided with an end which shall be integral with the adjacent portions, so as to be strong and reliable and in which seam cracks can not occur.

A still further object is to provide a hollow metal wheel spoke which shall have sector portions laminated and reinforced in such manner as to be light and strong with the use of the minimum amount of metal, and which shall be adapted to withstand severe strains adjacent to the wheel hub.

With the above-mentioned and other objects in view, the invention consists in an improved hollow drawn metal wheel spoke structure, the spoke preferably having an improved laminated reinforced sector portion to be secured to a wheel hub; and further, the invention consists also in the novel parts and combinations and arrangements of parts, and in improved spoke features, as hereinafter particularly described and further set forth in the claims appended hereto.

Referring to the drawings,—Figure 1 is a fragmentary central section showing a portion of the improved spoke and a novel manner of connecting it with a metallic wheel felly or a metallic portion of a felly; Fig. 2 is a fragmentary face view of a wheel having the invention incorporated therein; Fig. 3 is a front view of a portion of a wheel felly and the improved spoke connected thereto, a portion of the spoke being a central longitudinal section; Fig. 4 is an end view of the improved laminating part; Fig. 5 is a section on the line V—V in Fig. 3; Fig. 6 is a side view of the spoke; Fig. 7 is a side view of the spoke at right angles to Fig. 6; Fig. 8 is a section approximately on the line VIII—VIII in Fig. 1; Fig. 9 is a fragmentary view of the spoke partially formed; Fig. 10 is another view of the spoke partially formed; Fig. 11 is a transverse section of a metallic wheel felly showing the novel connection of the improved spoke therewith; and, Fig. 12 is a fragmentary plan of the inner side of the metallic felly.

Throughout the drawings similar reference characters in the different figures thereof indicate corresponding elements or features of construction herein referred to in detail.

The purpose and practical application of the invention will be clearly understood by reference to various parts of a wheel which comprises a hub 1 having bolts 2 for securing spokes thereto, the wheel including a felly which as shown comprises a metallic main portion 3 and sides 4 and 5 on which a suitable rim 6 is arranged that is provided with a tire 7. The main portion 3 of the felly has a hollow frustum 8 for each spoke, the frustum extending towards the wheel hub and having a circular opening 9 in its end to constitute a socket to receive a spoke tenon or dowel. In some cases the portion 3 may consist of a metallic lining on the inner side of the common wooden felly, if so desired.

Each spoke comprises a tubular inherently continuous body portion 10 which preferably is drawn from sheet metal and seamless, one end thereof having a plug 11 tightly secured therein, the plug having a relatively large head portion 12 that is seated against the end of the spoke. The end of the head portion has an annular recess 13 adapted to receive the frustum 8 and permitting the head portion to have a bearing against the felly portion 3, a tenon or dowel 14 extending from the bottom of the recess to be entered in the socket opening in the frustum.

The opposite end of the body portion 10 has opposite flared portions 15 and 16 that are integral with the body portion, and two flat plates 17 and 18 extend integrally from the ends of the flared portions and convergently each toward the other to constitute members of a sector portion. Two other plates 19 and 20 that are to become the front and rear sides of the sector, extend integrally from the body portion 10 and the flared portions, and are integral with the plates 17 and 18 and the sector has a concavely curved end 21 that is integral with the plates 17 and 18 and the plates 19 and 20, the end 21 being inclined relatively to the plates 19 and 20 to correspond with a tapered seat portion with which the hub usually is provided. The side plates 19 and 20 are provided with bolt-holes 22 and 23 respectively, to receive the securing bolts 2. Spokes for the smaller wheels or for light weight vehicles, may be sufficiently stiff when composed of a single thickness of metal, as above described, especially if the sheet metal be of ample thickness for the strength required.

As a safeguard against structural failure of the improved spoke, a portion of the spoke is in some cases reinforced, especially adjacent to the hub and the contiguous portions of the spoke sector. The reinforcing part comprises a thimble 24 which is tightly entered in the body portion 10 and it has flared portions 25 and 26 corresponding to the inner sides of the portions 15 and 16 respectively, and from which short plates 27 and 28 extend convergently against the inner sides of the plates 17 and 18 respectively. A brace web 29 is fixed to the opposite portions 25 and 26 and to the portions 27 and 28, being arranged midway between the plates 19 and 20, and a tubular brace 30 is fixed at its middle portion to the web and extends to the side plates 19 and 20, being in alignment with the bolt-holes 22 and 23 to receive the securing bolt 2.

In the process of forming the improved spoke a plate of sheet metal, preferably a disk, is used, and the middle portion thereof becomes the end 21 of the sector, the plate being suitably shaped to form the different sector wall plates and a tube 10' of larger diameter than the finished spoke, into which the reinforcing part may be inserted, the tubular portion having inclined side portions 31 and 32 extending to the junction of the sector wall plates, after which the tubular portion is further drawn and reduced in diameter to constitute the body portion 10 and the flared portions 15 and 16, the side portions 31 and 32 being drawn together in the process until they are in alignment with the plates 19 and 20 respectively, when the body of the spoke is to be equal in diameter to the dimensions between the side plates 19 and 20.

In practical use, the spokes are slightly elastic and are not liable to become fractured, but safely carry the loads that may be imposed upon them, the slight vibrations resulting from operations of the wheel on roads being uniformly distributed throughout the wheel; and it being understood that the spokes are tightly assembled and secured to the wheel hub and the felly, noiseless operation results.

What is claimed as new is:

1. A metal wheel spoke comprising a sector end closure plate constituting a spoke structure center, the plate being imperforate and inherently continuous, sector side plates integrally connected one to another and to the closure plate, and a hollow spoke body integrally connected to all the side plates, all being composed of a single unbroken piece of drawn metal and inherently continuous, the end of the spoke body being the terminal portion of the structure.

2. In a hollow metal wheel spoke, a reinforcing part comprising a hollow cylindrical thimble to fit into the body of the spoke, the thimble having flared portions corresponding to flared portions of the spoke, short flat plates extending convergently each towards the other to line the inclined sides of the sector portion of the spoke, a web fixed to the flared portions of the thimble and to the middle portions of said flat plates, and a tubular brace fixed at one side of its middle portion to the middle of the edge of the web.

In testimony whereof, I affix my signature on the 15th day of November, 1923.

VIOLA M. WELCH,
*Executrix of the last will of John R. Welch, Deceased.*